United States Patent [19]

Carter, deceased et al.

[11] 3,874,830
[45] Apr. 1, 1975

[54] APPARATUS FOR POST TREATING PREFORMED FOAM CONTAINERS

[75] Inventors: Paul H. Carter, deceased, late of Baltimore, Md. by Leona Marie Carter, Studio City, Calif. personal representative; Thomas E. Marion, Owings Mills, Md.

[73] Assignee: Maryland Cup Corporation, Owings Mills, Md.

[22] Filed: May 16, 1973

[21] Appl. No.: 361,351

[52] U.S. Cl................ 425/4 R, 425/384, 425/394, 425/398, 425/451, 425/817 R
[51] Int. Cl....................... B29c 1/16, B29d 27/00
[58] Field of Search........... 425/348, 345, 349, 350, 425/340, 4, 817 R, 397, 398, 399, 443, 451, 384, 394

[56] References Cited
UNITED STATES PATENTS

| | | | |
|---|---|---|---|
| 3,069,725 | 12/1962 | Root | 425/817 X |
| 3,225,126 | 12/1965 | Bridges et al. | 425/817 X |
| 3,261,055 | 7/1966 | Dart | 425/817 X |
| 3,619,438 | 11/1971 | Cistone | 425/817 X |

*Primary Examiner*—Francis S. Husar
*Assistant Examiner*—David B. Smith
*Attorney, Agent, or Firm*—Birch and Birch

[57] ABSTRACT

A system and apparatus for post treating preformed partially finished two piece containers made from foam plastic sheet material first processed with conventional machinery to form the containers. Then post treating the preformed containers by a system and with apparatus, said system including a post treatment process and said apparatus including means for moving novel mold assemblies loaded with the preformed containers to be post treated by applying steam thereto along a circular path from a loading station through successive steam treating, air cooling and ejecting stations for subsequent packaging.

6 Claims, 7 Drawing Figures

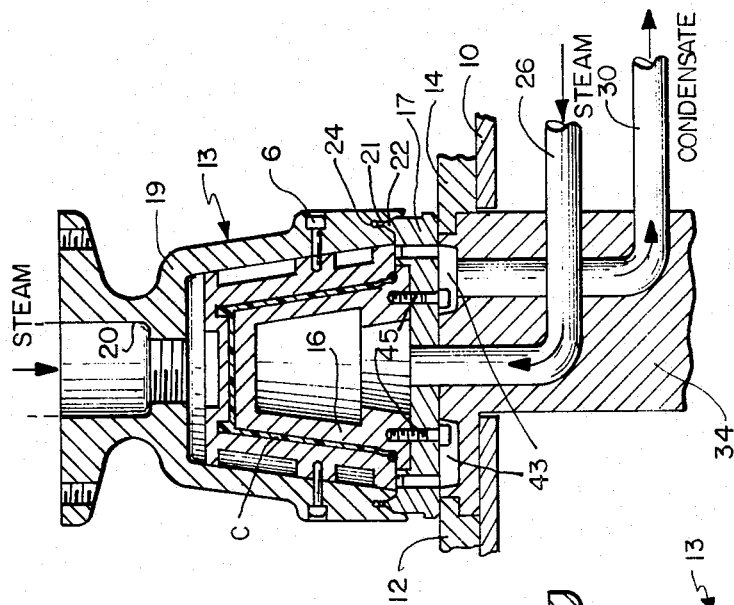
FIG. 6
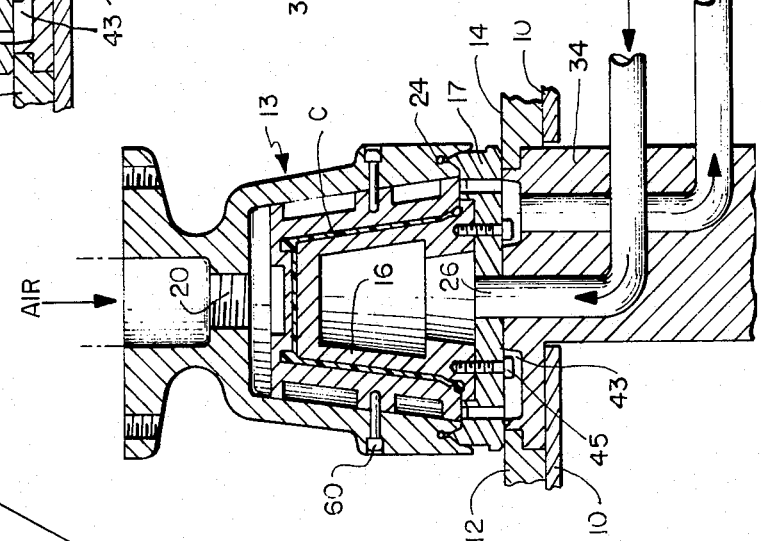
FIG. 7
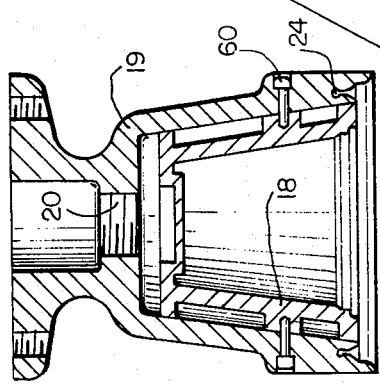
FIG. 5
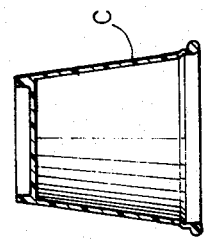
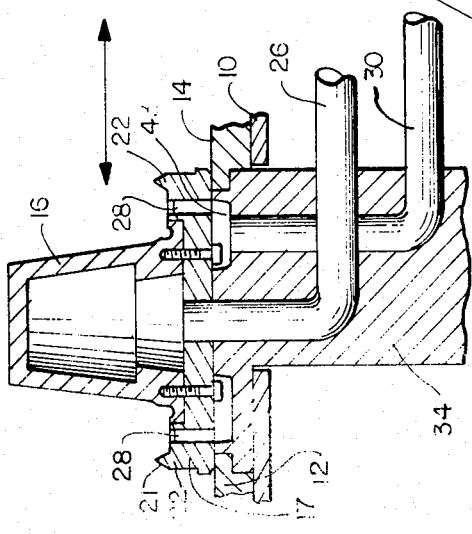

3,874,830

APPARATUS FOR POST TREATING PREFORMED FOAM CONTAINERS

This invention relates generally to a machine for treating partially completed containers formed at least in part from cellular plastic materials, such as styrene foam plastic material and such for example as produced on a conventional two-piece cup machine.

Each such partially made container preformed by a conventional machine is fed to a novel rotary treating machine into a mold of suitable perforate material comprising male and female parts.

After the partially made two-piece cup is inserted in a respective mold assembly mounted on a rotatable table of the treating machine, the table is rotated by suitable drive means, not shown, to different treating stations, which serve to finish and eject the container or cup from the treating machine as the mold assemblies with the containers or cups to be treated traverse a rotary path of travel through the different treating areas, until final ejection of the finished product.

After start of the post treating operation at a product loading station to load the molds with partially formed cups or the like, the machine table with the molds rotates to the first treating station provided to introduce steam through upper and lower conduits into the top and bottom mold parts which are automatically moved for loading, treating and final ejection with respect to each other as they are rotated continuously by the treating machine drive means along a circular path of travel. The function of the steam is to heat the foam plastic material to a predetermined degree, to the point that the expansion of the gas in the foam sheet material along with the heat and compression provided by the mold parts when closed together produce a seamless smooth one-piece container from the preformed container originally loaded in the mold assemblies.

The treating stations in the path of travel imparted by the rotary machine to the mold assemblies from the first treating steam station to the second air treating station includes a table rotating around a center upright and a centrally fixed manifold means ported by suitable control valve means, connected with upper and lower air conduits to introduce first steam and then chilled air into the top and bottom of the mold assemblies.

Following the air treating station, the rotatable table carries the air cooled cup, now a finished one piece cup to male and female mold core separating and air ejecting stations and finally to any desired arrangement for stacking and packaging after the finished cups are thus ejected from the machine.

Accordingly, it is an object of this invention to provide a novel post treating system and apparatus for preformed partially finished containers, such as two-piece cups, whereby such containers are heat treated preferably by steam while compressed in the mold assemblies, cooled and ejected as finished single pieces containers.

Another object is to provide novel mold assemblies arranged to receive and to be loaded with partly finished cups to be post treated in a rotary machine by steam while compressed in the male and female mold parts of novel mold assemblies moved in a circular path for such treatment.

Still another object is to provide novel mold assemblies with discharge ports and conduits for exhaust of condensate developed from the steam supply introduced in the mold assembly.

Yet another object is to provide novel mold assemblies having mating male and female cores with intake ports connected to steam conduits and exhaust chambers for steam condensate and valve means to direct coolant, such as air, to intake ports for cooling the container in the respective male and female mold cores prior to their separation for final air ejection of the finished containers.

Another object of the invention is to provide centrally positioned valve control means and manifold means to alternately introduce steam and then air into the mold assemblies as they traverse a circular path of travel during post treatment of the container from the loading station to a final ejection station.

Still another object is to provide a novel process for post treating and finishing partially formed cups from styrene foam plastic sheet, while the cups being treated are continuously revolved around a central manifold area through starting, heating, cooling and ejecting cup finishing stations.

Other objects and advantages of this invention will be apparent from a consideration of the following detailed description in connection with the accompanying drawings in which:

FIG. 5 is a diagrammatic illustration of the male core moved radially outward on the mold mounting table by cam means which imparts movement to the male core holder and showing the female core raised above the level of the male core by means of cam and shaft means connected to the female core, showing a partially formed two piece container made of styrene foam plastic sheet material;

FIG. 6 shows the porous mold cores together with the container compressed in the mold assembly being treated by steam; and FIG. 7 shows the steam cut off and air introduced into inlet openings at the top and bottom of the mold assemblies.

Figure 1:
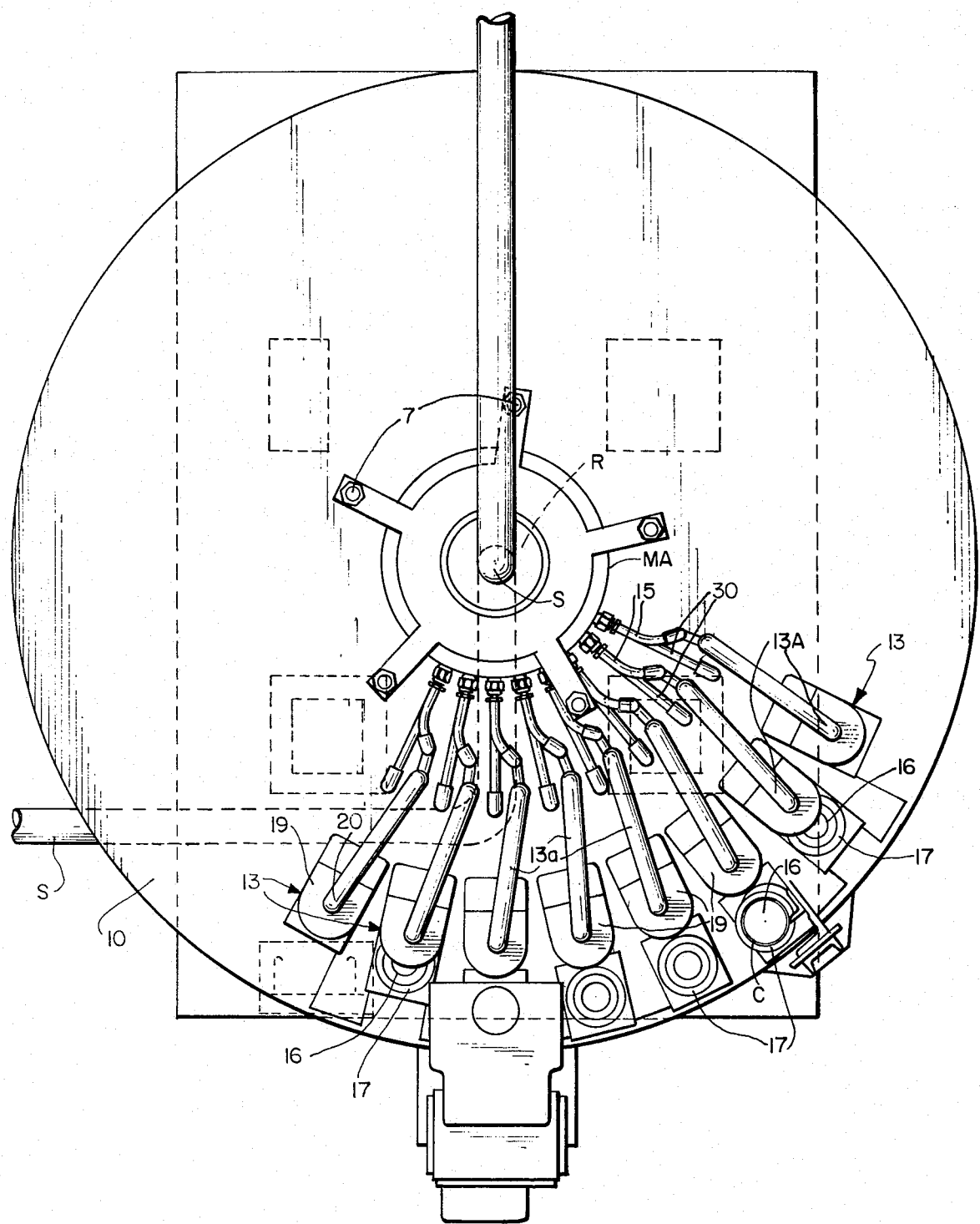
FIG. 1 is a top plan view of the present machine showing the mold assembly, rotatable table, and the central valve and manifold means for introducing steam and air into the mold assemblies.
Figure 2:
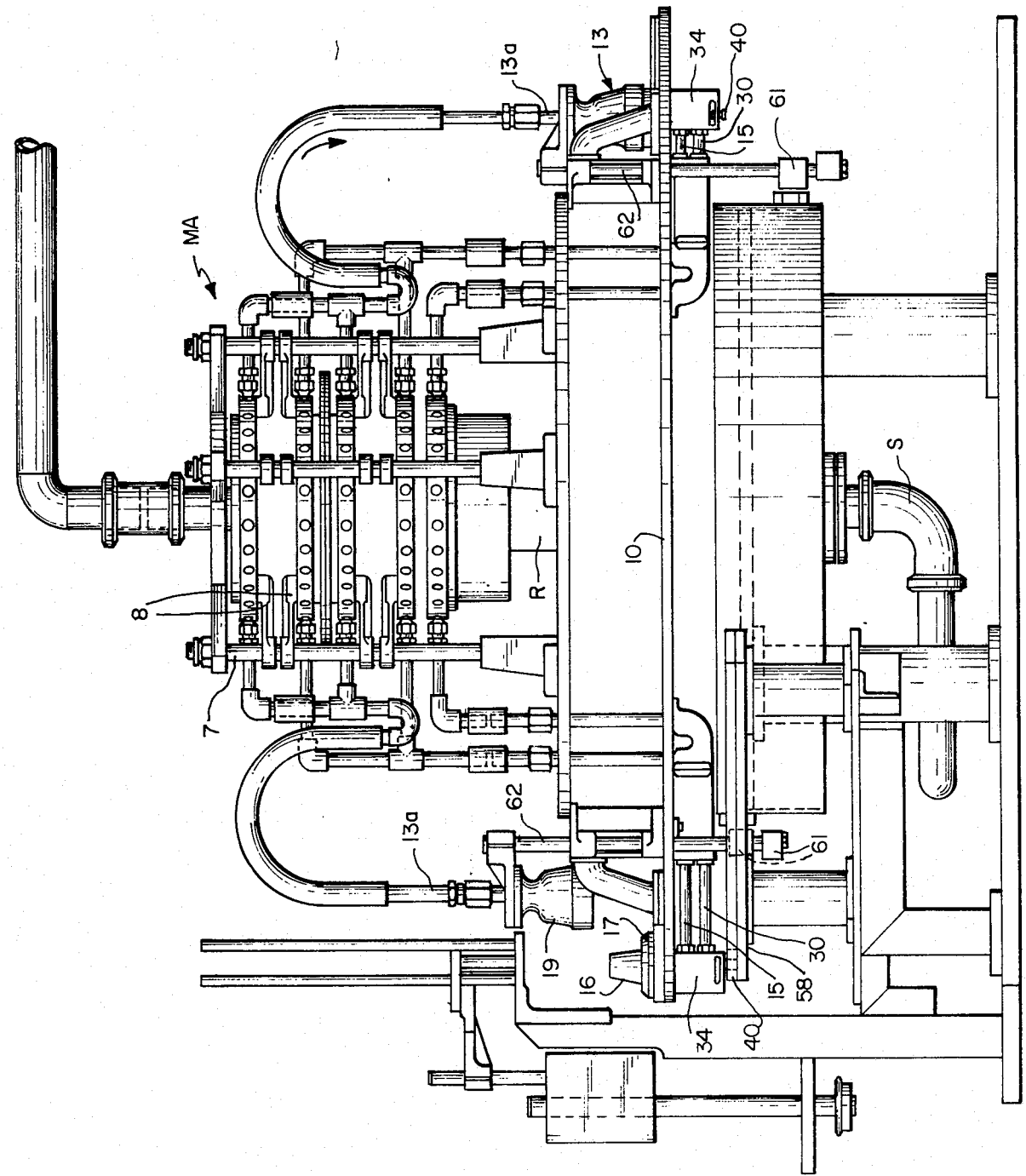
FIG. 2 is a side elevation view of the machine shown in FIG. 1.
Figure 3:
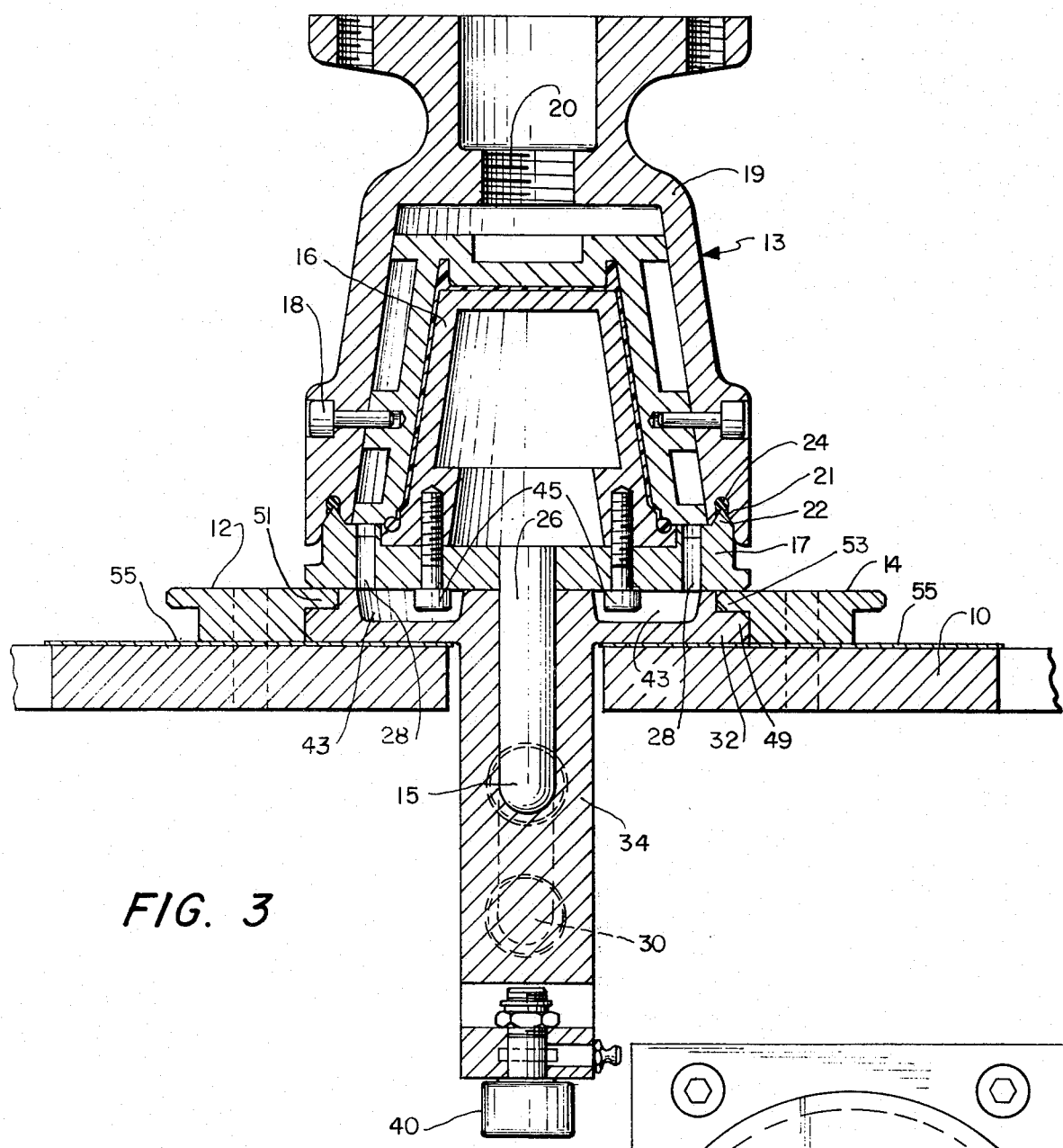
FIG. 3 is a longitudinal cross section view of one of the mold assemblies of the post treating machine showing the male and female cores and their respective holders with the ports in the top and bottom of the asemblies for entry and exhaust of steam or air according to the treating station location of the said assemblies with respect to the central valve and manifold means.
Figure 4:
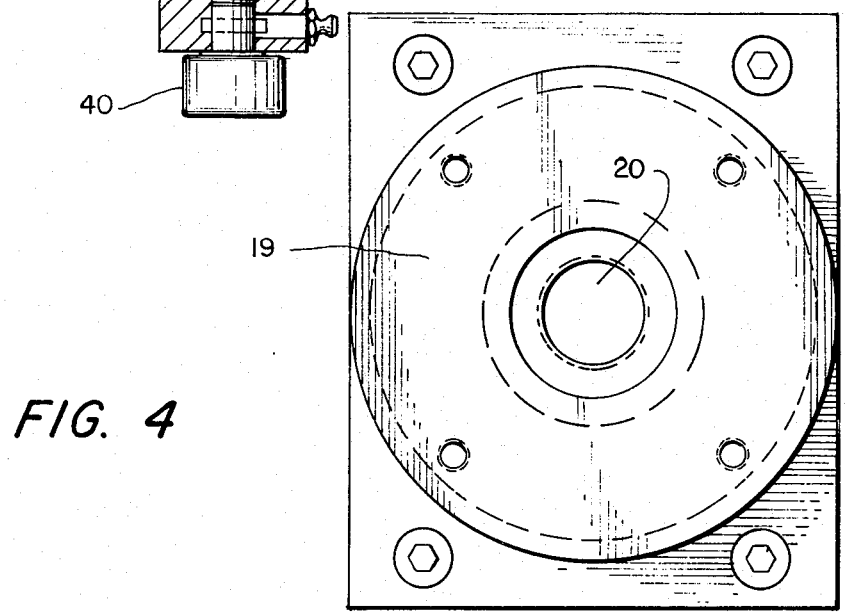
FIG. 4 is a top plan view of the mold assembly shown in FIG. 3.

Referring to the drawings and first with particular reference to FIGS. 1, 2 and 3, there is shown the general arrangement of the rotary post treating machine. The post treating rotary machine generally comprises the revolvable table portion 10 journalled by suitable bearings to the centrally disposed upright R adjacent which extends the intake steam conduit S to the fixed central manifold MA. These manifolds are ported to align with the open interior end of conduits carried by rotating valve means V of the machine for introducing steam and then coolant, such as air into inlet ports 20 and 26 in the top and bottom of mold assemblies 13 into which partially formed two piece containers (such as cups C previously formed with suitable conventional cup machinery) are loaded. The vertical standards 7 and valve arms 8 constrain the valve means V, to rotate with the table 10 and selectively register with the ports (not shown) of the fixed manifold MA to thereby introduce first steam into the inlet ports of the mold assemblies 13 and after such steam treatment of the partially formed cups to shut off the steam flow to the mold assemblies 13 and open the air manifold ports by the valve means V to introduce fluid, such as chilled air, into the mold assembly inlet ports 20 and 26, see FIGS. 1, 2, 3 and 4. Such a central valve and manifold arrangement is well known in the art and is generally illustrated in U.S. Letters Pat. No. 3,069,725 to A. A. Root, issued Dec. 25, 1962.

Thus as generally shown, there are multiple conduits 13a and 15 for introducing first steam and then air into the mold inlet ports 20 and 26, respectively. Thus the respective steam and air conduits 13a, 15 are programmed to first introduce steam into the mold assemblies 13 from the valve means V and the manifold MA and then as the table 10 rotates in its cycle the said conduits 13a, 15 introduce chilled air under pressure into the top and bottom of the mold assemblies 13, 16 as the machine table 10 continuously revolves through its cycle of operation.

An important feature of the invention resides in novel cam means to separate the mold assemblies for loading each mold at the start of each post treating cycle and a second cam means for radially horizontally sliding the male core for position in and out from registry with the female core to close the mold cores at the steam treating and air treating stations, as the table 10 of the machine revolves around the centrally fixed ported manifold means MA. This movement of the mold cores is described hereinafter in connnection with FIGS. 5, 6 and 7 of the drawings.

The cup treating machine includes the rotary table 10 suitably power driven as by gear means mounted below the table to provide an automatic machine and centrally controlled steam and air supply means as the table turns. The rotary table 10 is so proportioned and so formed as to mount a plurality of mold assemblies 13 of any feasible or practical number, see FIG. 1.

The mold assemblies comprise a male part or core 16 and a female part or core 18 which mate together, to thereby receive and hold a partially formed cup, with the bottom made from any suitable plastic material, either of foam plastic or of non-cellular plastic, such as cup C being held between the respective mold parts, as shown in FIGS. 3 through 7 of the drawings. As an example, there may be five or more starting or cup loading nstations like the one shown in FIGS. 2 and 3 on the rotary treating table 10.

As the table rotates the male core slides radially outward between guides 12 and 14 mounted on the table 10 by a first cam means 58 and the female core is simultaneously raised up to provide for loading by a second cam means 61 see FIGS. 2 and 5. As the molds leave the loading station locations and travel with the table 10, the male and female parts automatically come together by action of the first and second cam means 61 described generally in connection with FIGS. 1, 2 and 3 and the mold assemblies are moved to respective or individual steam treating stations with the container to be treated loaded therein, where steam is introduced at the top of the female mold core holder and at the bottom of the male core holder from conduits 13a and 15 into intake ports 20 and 26, see FIGS. 2 and 6.

As an example, there may be ten steam treating stations and the steam supply is controlled by means of the central valve system shown in FIGS. 1 and 2. The valve system includes centrally fixed manifold arrangements MA and valves V see FIGS. 1 and 2, from which selective sets of steam and air conduits generally indicated as 15 for steam or air extend to the lower mold or male core 16, see FIGS. 2 and 6 through 7. Condensate or air exhaust conduits 30 are also provided for the mold assemblies 13.

A holder 19 is provided for the female core 18. This holder 19 is preferably bell-shaped with a top central steam or air inlet opening 20 and is formed with an annular V-shaped groove 21 to fit over an upstanding V-shaped rim 22 of the male core holder 17. The apex or bottom of the groove 21 in the female holder 19 may include a suitable packing ring, such as an "O" ring 24 ro provide a tight fluid seal of the mold cores in their respective holders 17 and 19, see FIG. 3.

The male core holder 17 may, for example, be a plate with the central steam or air inlet opening 26 concentrically positioned with respect to several condensate outlet openings 28 to permit discharge of condensation into a condensate outlet conduit 30, see FIGS. 3 and 6.

The entire male core assembly is supported on a sliding base 32 connected with the male core holder 17 to provide for mold separation at the loading or final ejection stations. This sliding base 32 is formed with an elongated reduced or leg portion 34 containing the inlet and outlet conduit ports or connections 15 and 30 and carries a cam follower roller 40 which is mounted on the free end of the leg portion 34. The sliding base portion 32 in the form of an annular plate is gouged out to provide chambers 43 between its top face and the bottom surface of the male core holder 17. These chambers connect with air or condensate outlet 30 and serve two functions: one, to provide outlet chambers for the air or steam condensate, see FIG. 6, supplied to the mold cores through steam or air inlet openings 20 and 26 in the respective male and female core holders; and two, to provide a clearance chamber for heads of stainless steel fasteners, such as tap screw 45, see FIG. 3.

The peripheral edge face of the sliding base 32 is provided with an annular flange 49 countersunk below the normal face of the annular plate or sliding base 32. This flange 49 engages under flanges 51 and 53 of the spaced guide rail means 12 and 14 mounted on the table 10. The table 10 may be provided with sliding base liner means 55 of anti-friction material and is positioned between the underside of the sliding base plate 32 and the bottom portion of the spaced guide rails 12 and 14.

The leg 34, beneath the sliding base 32, at its free end, carries the cam roller 40, which engages with a suitable curved cam track 58, see FIG. 2, mounted below the table 10 at a proportionally calibrated position, to thereby move the male mold core 16 radially out from under the female core 18 when the latter is raised by the lift cam 61, see FIGS. 2 and 5.

With refrence to FIG. 3, there is shown one of the mold core holder assemblies 13 and how the complete container or cup holding unit is put together including the female mold core 18 maintained in its holder 19 with retainer means, such as bolts 60 and the male mold core 16 maintained in its holder 17 by tap screws 45. The female mold core holder 19 and the female mold core 18 act as a unit and are movable vertically, as shown in FIG. 2, by lift cam 61 and rod means 62 to a predetermined extent, for example, approximately five inches to separate the female core 18 from the male core 16, which is moved outwardly by the cam roller 40 and cam track 58. The male core 16 is fastened to holder 17 which in turn is suitably fastened to the slidable base member 32. This slidable or sliding base member, slides horizontally radially out from the center of the machine on the table 10 when the female core 18 and core holder 19 are raised up to a suitable separation height from contact with the male core 16 to provide for loading with containers to be treated and for final ejection after the post treating cycle is completed, see FIGS 1, 2 and 7.

Now with reference to FIG. 5, the machine is started to provide for loading partially finishehd containers, for example, cups C in the molds. At this loading stage when the female core or mold is raised by the suitable cam 61 and rod means 62, see FIGS. 1, 2 and 7, in the up position and out of contact with the male core 16, the partially completed container or cup made of styrene foam plastic sheet material is loaded or placed on the male core 16, which has been moved outward radially on the table 10. The male mold 16 is then moved under the female mold 18, which is then moved down, by said cam means 61 and rod means 62 to a closed position for steam treatment.

Next, in reference to FIG. 6, after the mold cores are closed steam is introduced by 13a and 15 into the top and bottom of the mold parts at the intake openings 20 and 26 by means of the central valves V to control the ports of manifold MA at the center of the machine.

The male and female molds may be made of metallic material which may be porous or formed with a plurality of minute holes to permit the steam to come into contact with the foam plastic material, thereby causing a curing action to the container material compressed between the mold cores 16 and 18.

In reference to FIG. 2, as the machine table 10 continues to rotate and carry with it the central valves V and the respective mold assemblies with their steam treated cup therein, around the central point of the machine, a central steam valve V shuts off the steam and turns on an air valve V, whereby air is introduced from the manifold ports through the lines 13a and 15 to the top and bottom inlets 20 and 26 of the mold core holders 17 and 19 to the molds 16 and 18 in place of the steam to cool the finished container.

As the machine table 10 continues to rotate, the female mold is raised by the lift cam 61, and rod 62 see FIG. 2, and then the male mold is moved radially out to a position by its cam 58, roller 40 and sliding base 32, as shown in FIG. 5. At this position, air is then introduced from central manifold MA into the bottom of the male mold only, by means of the arrangement of the manifold ports associated with one of the central valves V U, and the finished cup or container C is blown off the male mold 16.

After ejection of the finished cup C from the male mold 16 by the air means, the cups are collected for stacking and packaging.

While we have shown and described our invention in detail and specifically described certain apparatus for practising this invention, we wish it understood that the apparatus illustrated is not necessarily limited to such specific apparatus when post treating preformed partially finished containers by our method within the scope of the appended claims.

What we claim is:

1. An apparatus for post treating assembled containers made from foamed plastic sheet material comprising a rotatable table with an upper peripheral surface, mold assemblies mounted in a circular path on said upper peripheral surface, said assemblies having mating male and female parts, said male part being horizontally movable radially inboard and outboard of said table surface, into and out of alignment with said female part, said female part being vertically movable upward above said male part and to permit the latter to move outward of said table to a container loading position, said table starting rotation at the loading position and continuously rotating therefrom, cam means activated by said table as it rotates for moving said male and female parts to said container loading positions and thence to closed mating positions to confine the container between the said parts, each of said parts having holder means with inlet ports in said holder means for introducing first steam and then air into said ports in said holder means and said mold parts to treat said container confirmed between them, as the table revolves; said steam acting to expand said container within said mold parts to impart uniform finish and dimension to said containers.

2. An apparatus for post treating partially assembled containers as described in claim 1, wherein said containers being post treated are one or two piece cups.

3. An apparatus for post treating partially assembled containers as described in claim 1, wherein said mold parts are formed of metal.

4. An apparatus, for post treating containers, as described in claim 1, wherein said table rotates in a continuous cycle by suitable drive means from said starting container loading position, to said steam treating position, to said air treating position, and to a container ejecting station and back to said starting loading position for start of a new cycle of rotation.

5. Apparatus for post treating containers, as described in claim 1, wherein said ejecting station is provided with conduit means for introducing air through said male part holder means and whreby said cam means comprises a first cam roller and a second cam roller each to cooperate with cam track means suitably mounted below said table, said first cam roller moving said female part and its holder above the male part holder, and said second cam roller moving said male part and its holder to the said outboard position as the container ejection air is introduced into the said inlet port of the male part holder to eject the finished container from its mold assembly.

6. An appartus for post treating assembled containers made from plastic sheet material as described in claim 2, wherein said mold parts are made of pervious metailic material to provide rapid transfer of heat to the said foam plastic sheet material when steam is introduced into the said mold assemblies through their respective male and female mold parts.

* * * * *